United States Patent
Wiseman et al.

(10) Patent No.: US 9,789,971 B2
(45) Date of Patent: Oct. 17, 2017

(54) PRE-CURED EME EDGE SEAL

(71) Applicant: The Boeing Company, Chicago, IL (US)

(72) Inventors: Jesse Randal Wiseman, Everett, WA (US); Kevin Darrell Pate, Kirkland, WA (US); Matthew G. Chaney, Marysville, WA (US)

(73) Assignee: The Boeing Company, Chicago, IL (US)

( * ) Notice: Subject to any disclaimer, the term of this patent is extended or adjusted under 35 U.S.C. 154(b) by 192 days.

(21) Appl. No.: 14/722,117

(22) Filed: May 26, 2015

(65) Prior Publication Data
US 2016/0276679 A1 Sep. 22, 2016

Related U.S. Application Data

(60) Provisional application No. 62/136,369, filed on Mar. 20, 2015.

(51) Int. Cl.
F16J 15/02 (2006.01)
F16J 15/14 (2006.01)
F16J 15/10 (2006.01)
B64D 37/02 (2006.01)
B64D 37/06 (2006.01)
H01M 8/0276 (2016.01)
H01M 8/0286 (2016.01)
B60K 15/03 (2006.01)

(52) U.S. Cl.
CPC ............ *B64D 37/06* (2013.01); *F16J 15/022* (2013.01); *F16J 15/14* (2013.01); *B60K 2015/03447* (2013.01); *B64D 37/02* (2013.01); *F16J 15/104* (2013.01); *H01M 8/0276* (2013.01); *H01M 8/0286* (2013.01); *H01M 2250/20* (2013.01); *Y02T 90/32* (2013.01)

(58) Field of Classification Search
CPC ........ B64D 37/02; B64D 37/06; B64D 37/32; B60K 2015/03447; F16J 15/022; F16J 15/10; F16J 15/104; F16J 15/14
See application file for complete search history.

(56) References Cited

U.S. PATENT DOCUMENTS

| 6,361,055 | B1 * | 3/2002 | Grover | B64G 1/402 220/560.05 |
| 2010/0107513 | A1 * | 5/2010 | Buchanan | B64C 3/18 52/84 |
| 2010/0264274 | A1 * | 10/2010 | Bradley | B32B 3/26 244/135 R |
| 2011/0315818 | A1 | 12/2011 | Chao et al. | |
| 2016/0010322 | A1 * | 1/2016 | Yonkers | E04B 1/3211 52/81.3 |

* cited by examiner

*Primary Examiner* — Nicholas L Foster
(74) *Attorney, Agent, or Firm* — Kolisch Hartwell, P.C.

(57) ABSTRACT

An aircraft fuel cell seal and methods of its use. The disclosed seal takes the form of a pre-cured, partially hollow elongate member that does not subtend a complete circle, but rather leaves an elongate gap in the member that can be placed over an edge or fillet of a fuel cell. In some cases, chambers within the member may be filled with wet sealant to provide redundant protection against EME effects.

20 Claims, 10 Drawing Sheets

PRE-CURED EME EDGE SEAL

CROSS-REFERENCE TO PRIORITY APPLICATION

This application is based upon and claims the benefit under 35 U.S.C. §119(e) of U.S. Provisional Patent Application Ser. No. 62/136,369, filed Mar. 20, 2015, which is incorporated herein by reference in its entirety for all purposes.

FIELD

This disclosure relates to protecting an aircraft fuel cell from electromagnetic effects. More specifically, the disclosed embodiments relate to systems and methods for applying pre-cured seals to the edges and fillets of an aircraft fuel cell.

INTRODUCTION

To contain fuel and protect against electromagnetic effects (EME), aircraft fuel cells must be sealed in a manner that meets aircraft industry standards as well as legal and regulatory requirements. Currently, edges and overlapping fillets are sealed by applying a wet sealant by hand. This is a time-consuming, laborious process, and even when performed perfectly it fails to provide redundant protection against fuel cell leaks or defects which may compromise EME performance. Furthermore, wet sealant can contain hidden defects, which may be difficult or impossible to detect during a normal inspection. Accordingly, improvements in fuel cell sealing systems and methods are desirable, to decrease labor costs, reduce defects, and provide redundant protection, leading to greater aircraft safety.

SUMMARY

The present disclosure provides an aircraft fuel cell seal that takes the form of a pre-cured partially hollow elongate member. The pre-cured member includes a thick outer shell and a plurality of open chambers disposed within an open channel of the outer shell and configured to receive wet sealant. The outer shell does not subtend a complete circle, but rather extends through a tangential angle between 180 degrees and 360 degrees, leaving an elongate gap in the shell that can be placed over an edge or fillet of a fuel cell after the chambers have been filled with wet sealant. In some embodiments, both the chambers and the outer shell have a thickness sufficient to meet the safety requirements of a fuel cell seal, in which case the combination of the wet sealant and the pre-cured outer shell provide redundant EME protection.

Features, functions, and advantages may be achieved independently in various embodiments of the present disclosure, or may be combined in yet other embodiments, further details of which can be seen with reference to the following description and drawings.

DESCRIPTION

Overview

Figure 1:
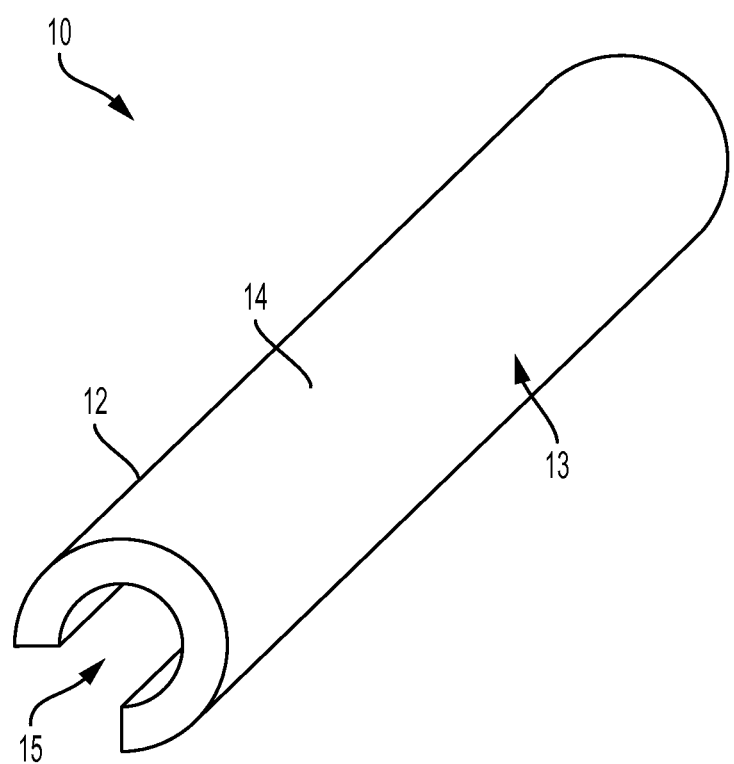
FIG. 1 is an isometric view of an embodiment of an aircraft fuel cell seal, according to aspects of the present disclosure.

Various embodiments of an aircraft fuel cell seal includes a pre-cured elongate member with an outer shell having an open channel, a plurality of chambers within the shell that can receive a wet sealant, an elongate gap in the shell to allow the shell to be placed on a fuel seal edge or fillet, and/or support members within the shell, are described below and illustrated in the associated drawings. Unless otherwise specified, according to the present teachings a fuel cell seal and/or its various components may, but are not required to, contain at least one of the structure, components, functionality, and/or variations described, illustrated, and/or incorporated herein. Furthermore, the structures, components, functionalities, and/or variations described, illustrated, and/or incorporated herein in connection with the present teachings may, but are not required to, be included in other similar seals that may be used in the aircraft industry. The following description of various embodiments is merely exemplary in nature and is in no way intended to limit the disclosure, its application, or uses. Additionally, the advantages provided by the embodiments, as described below, are illustrative in nature and not all embodiments provide the same advantages or the same degree of advantages.

According to the present teachings, rather than sealing aircraft fuel cell edges and fillets by applying wet sealant by hand, a pre-cured seal may be provided. Such a seal may, for example, be hollow with a curved outer shell, and may have a radial cross section that subtends less than 360 degrees. For instance, an exemplary fuel cell seal may be a hollow partial cylindrical shell, such as a hollow cylindrical shell with a radial cross section that subtends 180 degrees, 270 degrees, or any other angle between 180 degrees and 360 degrees. As used in this disclosure, the terms "partial cylindrical shell," "partially cylindrical," "partial cylinder" and the like are used to indicate a cylinder with a portion of the cylinder removed or not present.

The resulting gap in the surface of the seal allows the seal to be placed around or about an edge or fillet of a fuel cell. Furthermore, the hollow interior or open channel of the seal can receive a wet sealant, so that the installed seal provides two layers of edge protection, namely the interior wet sealant and the exterior pre-cured shell. In one embodiment, after application of the wet sealant to the open channel of the seal, and the desired edge or fillet, the sealant is allowed to dry or cure such that the sealant and exterior pre-cured shell have essentially the same material composition/characteristic. During the curing process the wet sealant forms an adhesion bond to the pre-cured shell and the surface (edge or fillet). In some cases, the seal may be designed so that each of the two protective layers is sufficiently thick to meet industry safety requirements for fuel cell EME protection, thereby providing redundant EME protection to fuel cell edges and fillets.

EXAMPLES, COMPONENTS, AND ALTERNATIVES

The following sections describe selected aspects of exemplary aircraft fuel cell seals as well as related systems and/or methods. The examples in these sections are intended for illustration and should not be interpreted as limiting the entire scope of the present disclosure. Each section may include one or more distinct inventions, and/or contextual or related information, function, and/or structure.

Example 1

This example describes illustrative pre-cured aircraft fuel cells seal having an elongate, partially cylindrical or otherwise curved shape; see FIGS. 1-5.

FIG. 1 is an isometric view of an illustrative fuel cell seal, generally indicated at 10, according to aspects of the present teachings. Fuel cell seal 10 is a pre-cured elongate member 12 which has an outer shell 13 having an open channel 15. The open channel 15 includes a plurality of open chambers, generally indicated at 16 (see FIG. 2), disposed within the outer shell 13. Open chambers 16 are separated by support members 18 (see FIG. 3), which also may be referred to as support "ribs," also disposed within the outer shell. In the embodiment of FIG. 1, fuel cell seal 10 takes the form of a partial hollow cylinder having a curved outer shell 14, but more generally the pre-cured seal can be provided with any desired outer shape.

Figure 2:
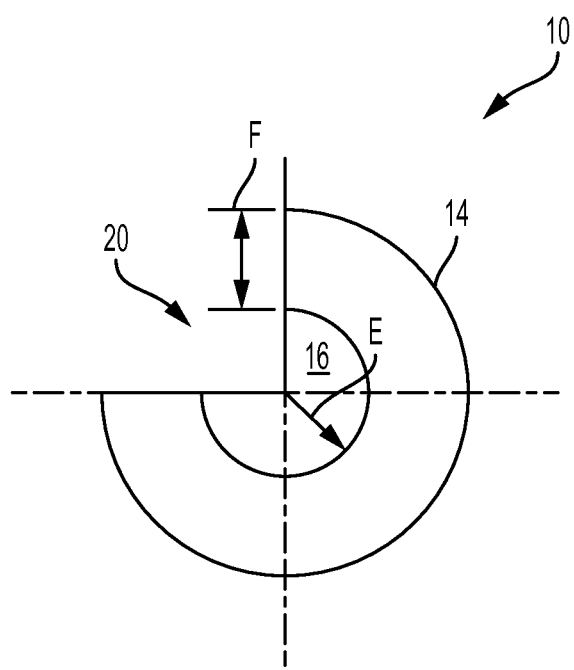
FIG. 2 is an end elevational view of the aircraft fuel cell seal embodiment of FIG. 1, taken along the direction of the long axis of the seal.

FIG. 2 is an end elevational view of the aircraft fuel cell seal embodiment 10 of FIG. 1, taken along the direction of the long axis of the seal. Curved outer shell 14 has a radial thickness, indicated by double-sided arrow F, which is at least equal to a predefined minimum radial thickness. The predefined minimum radial thickness of outer shell 14 may be sufficient to meet aircraft EME safety requirements for a fuel cell seal. For example, the predefined minimum radial thickness may be approximately 0.13 inches.

Outer shell 14 extends through a tangential angle of 270 degrees in FIG. 2, to form a partially cylindrical shell having an open channel 15 to define a gap generally indicated at 20. Accordingly, gap 20 extends through a tangential angle of 90 degrees. More generally, according to the present teachings the outer shell can extend through any tangential angle between 180 degrees and 360 degrees to define a complementary gap extending through a tangential angle between 0 and 180 degrees. Gap 20 allows the fuel cell seal to conform to a fuel cell edge or fillet, and also provides access to open chambers 16, so that a wet sealant can be disposed in the open chambers as described below in more detail. The angle subtended by the gap can be chosen to correspond to the angle subtended by a fuel cell edge or fillet to be protected. For example, a gap subtending 90 degrees will be well suited to protect a right-angle fuel cell edge. Gaps subtending acute or obtuse angles will be similarly well suited for protecting fuel cell edges subtending those same or similar angles.

Open chambers 16, which in the embodiment of FIGS. 1-2 are partially cylindrical, each have a radius, indicated at E, which is at least equal to a predefined minimum radius. In some cases, the minimum radius of open chambers 16 may, like the minimum radial thickness of outer shell 14, be sufficient to meet aircraft EME safety requirements for a fuel cell seal. For example, the predefined minimum radius may be approximately 0.13 inches. In this case, when open chambers 16 are filled with sealant and fuel seal 10 is installed on a fuel cell edge or fillet, the seal will provide redundant protection against possibly harmful EME effects, because the wet sealant and the outer shell will each independently provide EME protection sufficient to meet industry requirements. In some cases, the predefined minimum radial thickness of the outer shell and the predefined minimum radius of the open chambers may be equal.

Figure 3:
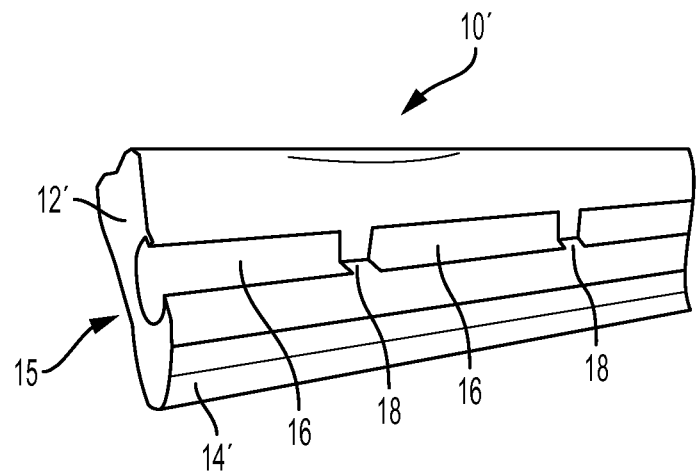
FIG. 3 an aircraft fuel cell seal embodiment according to aspects of the present disclosure, showing details of the interior of the seal.

FIG. 3 is a perspective view of an aircraft fuel cell seal embodiment 10', which is generally similar to fuel cell seal embodiment 10 of FIG. 1 except for its outer shape. More specifically, fuel cell seal embodiment 10' includes a pre-cured elongate member 12' which has a somewhat irregularly shaped outer shell 14', rather than a partial cylindrical outer shell as in the case of fuel cell seal embodiment 10. However, FIG. 3 depicts features of the interior of seal 10', including open channel 15', open chambers 16, and support members 18, which are identical to the interior features of seal 10, and which accordingly are labeled with unprimed reference numbers.

Support members or ribs 18 are provided between interior open chambers 16 to help center the fuel cell seal on a fuel cell edge or fillet, i.e., to ensure that approximately similar or equal portions of the seal are disposed on each side of an edge when the seal is installed. Support members 18 may have any dimensions and spacing suitable for accomplishing their purpose. For example, the support members each may have the same thickness, as indicated FIG. 3, and/or there may be a constant distance between consecutive support members. In some cases, the support members may be approximately 0.07 inches thick, and may be spaced approximately 0.5 inches apart from each other.

Figure 4:
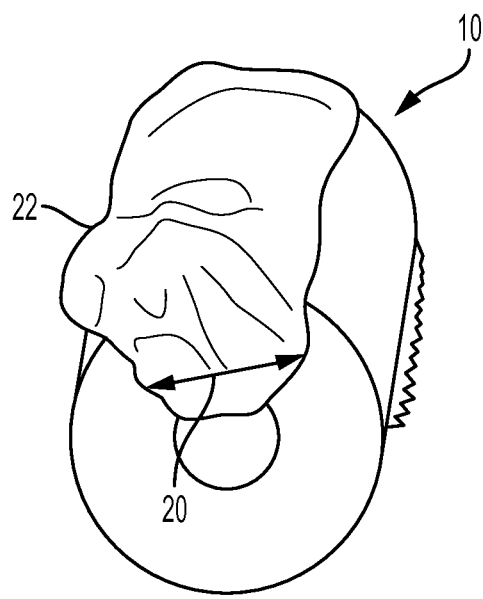
FIG. 4 is an isometric view showing the aircraft fuel cell seal embodiment of FIG. 1 partially filled with a wet sealant.

FIG. 4 is an isometric end view of the aircraft fuel cell seal embodiment of FIG. 1 partially filled with a wet sealant 22.

Wet sealant may be dispensed into gap 20 using any suitable sealant applicator. In some cases, the wet sealant may be dispensed to fill both gap 20 and chambers 16 entirely, even before the fuel cell seal is installed on a fuel cell edge or fillet. In other cases, such as depicted in FIG. 4, sufficient wet sealant may be applied to fill the gap and the open chambers, but the wet sealant may not actually fill the open chambers entirely until the seal is installed on a fuel cell edge or fillet, at which point sealant within the gap will be displaced into the chambers by the edge or fillet.

Figure 5:
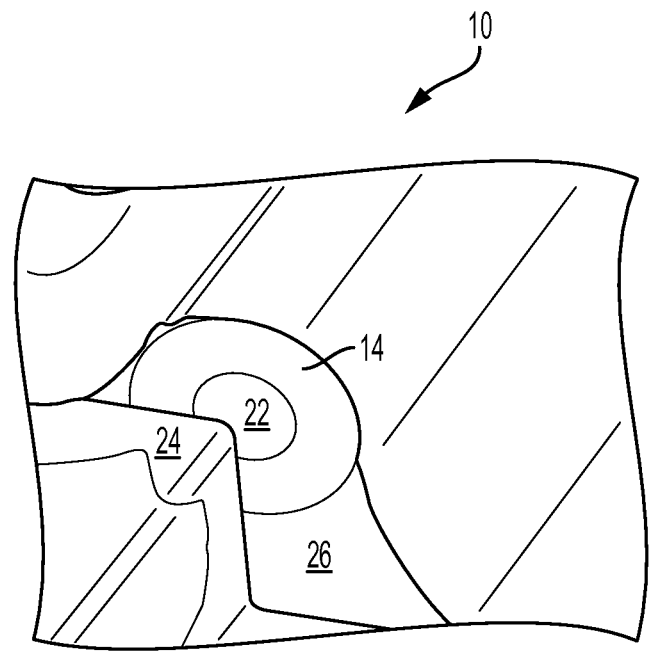
FIG. 5 is an isometric view showing the aircraft fuel cell seal embodiment of FIG. 1 installed on an aircraft fuel cell edge.

FIG. 5 is an isometric view showing a portion of the aircraft fuel cell seal embodiment of FIG. 1 installed on an aircraft fuel cell right-angle edge 24. As FIG. 5 indicates, wet sealant 22 now fills the hollow interior chambers 16 of the fuel cell seal, while outer shell 14 conforms to the right-angle shape of edge 24. Additional wet sealant, indicated at 26, has also been applied around seal 10, and then smoothed or faired to create smooth contours.

Example 2

This example describes the installation of a pre-cured fuel cell seal onto various types of fuel cell edges; see FIGS. 6-16.

Figure 6:
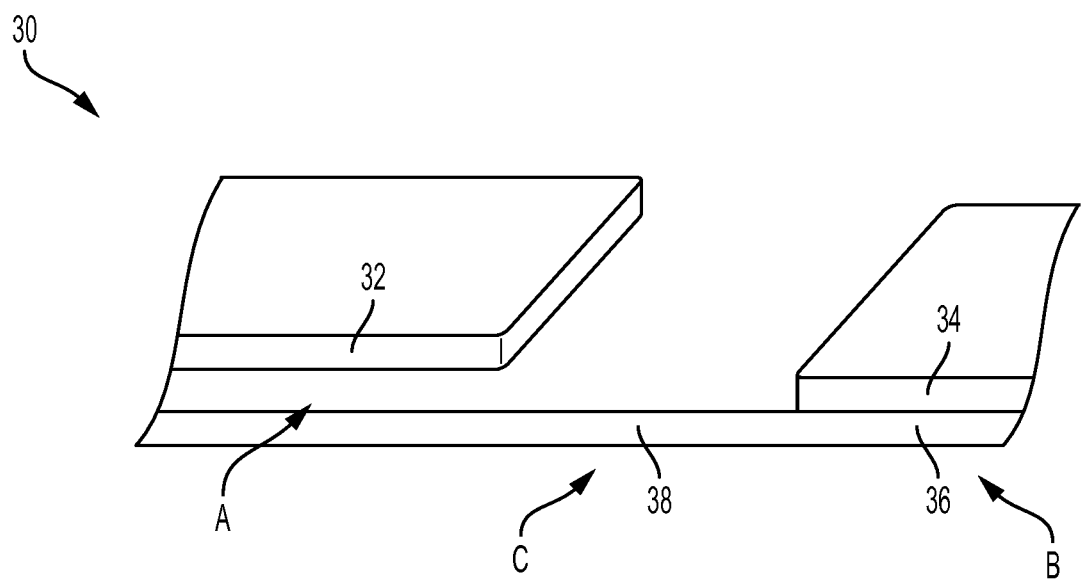
FIG. 6 is an isometric view showing portions of an exemplary aircraft fuel cell with edges to be protected against EME effects.

FIG. 6 is an isometric view showing portions of an exemplary aircraft fuel cell, generally indicated at 30, with various edges to be protected against EME effects. Specifically, a first portion of fuel cell 30, generally indicated at A, includes a fillet 32, or in other words an edge that is overlapped by an adjacent surface (off-set surfaces), leaving free only the top right angle surface of the edge. A second portion of fuel cell 30, generally indicated at B, includes upper and lower edges 34, 36 which are adjacent to each other and substantially flush at their front surfaces, leaving free the top right angle surface of the upper edge and the bottom right angle surface of the lower edge. A third portion of fuel cell 30, generally indicated at C, includes a free edge 38 which has both its top and bottom right angle surfaces free.

Figure 7:
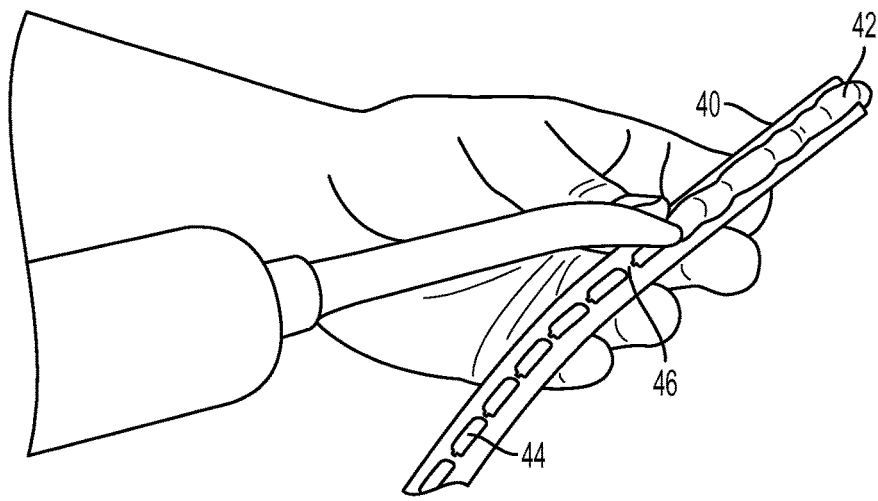
FIG. 7 shows a user filling an exemplary aircraft fuel cell seal with wet sealant, according to aspects of the present disclosure.

FIG. 7 shows a user filling an exemplary pre-cured aircraft fuel cell seal 40 with wet sealant 42, according to aspects of the present disclosure. Specifically, the user applies wet sealant 42 into a series of adjacent chambers or cavities 44 of fuel cell seal 40, and also possibly overlapping support members 46 which separate the adjacent chambers.

Figure 8:
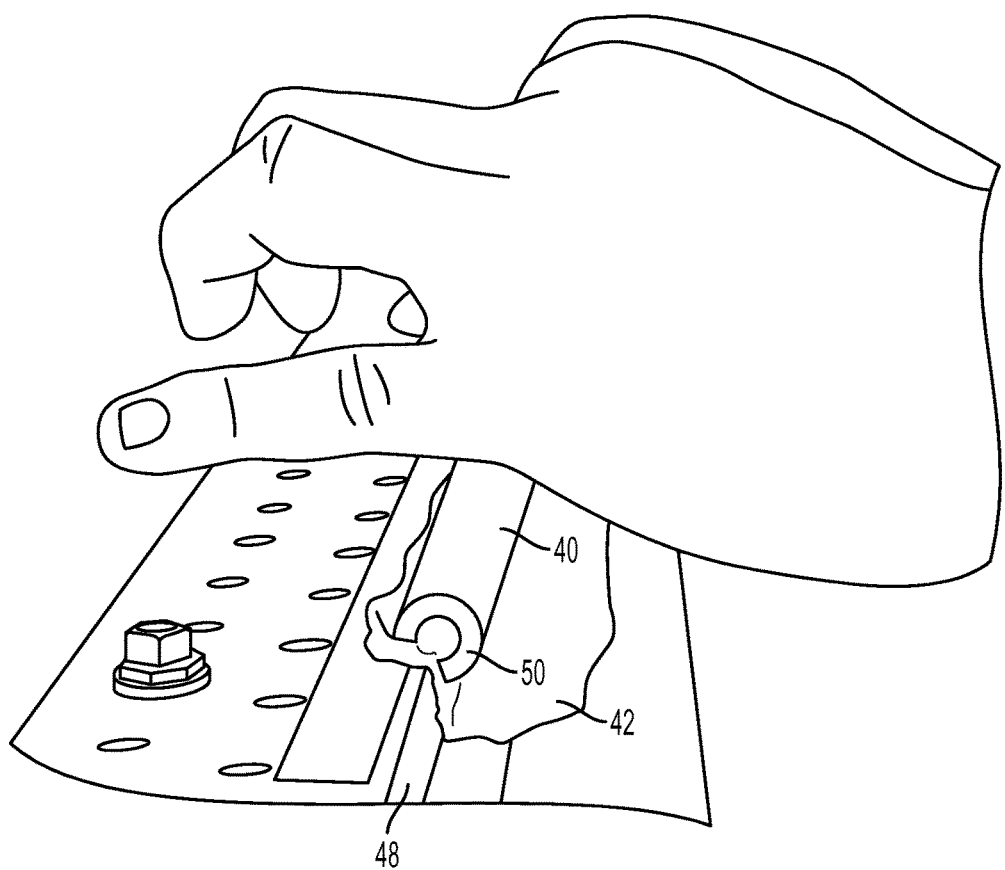
FIG. 8 shows a user placing an exemplary aircraft fuel cell seal onto a fuel cell fillet, according to aspects of the present disclosure.

FIG. 8 shows a user placing fuel cell seal 40 of FIG. 7 onto a fuel cell fillet 48 of the type indicated in region A of FIG. 6, according to aspects of the present disclosure. Seal 40 is placed onto the free right angle surfaces of fillet 48 with the outer shell 50 of the seal contacting the fillet surfaces, or perhaps separated from the fillet surfaces by a layer of wet sealant 42. Wet sealant 42 also may be pushed out of the seal and extent onto the fillet surfaces beyond where the seal meets the fillet.

Figure 9:
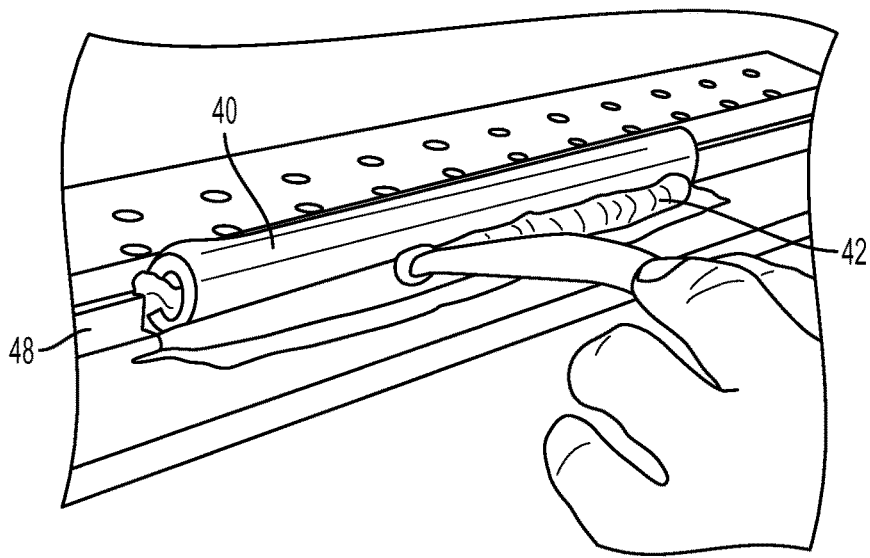
FIG. 9 shows a user applying additional wet sealant to the fuel cell seal of FIG. 8, after it has been placed onto a fuel cell fillet.

FIG. 9 shows a user applying additional wet sealant 42 to the lower intersection region where fuel cell seal 40 meets fillet 48, after the has been placed onto the fillet as in FIG. 8. The additional wet sealant applied in FIG. 9 may provide additional and/or redundant EME protection of fillet 48, as described previously. For similar reasons, additional wet sealant also may be applied at the upper intersection region where fuel cell seal 40 meets fillet 48.

Figure 10:
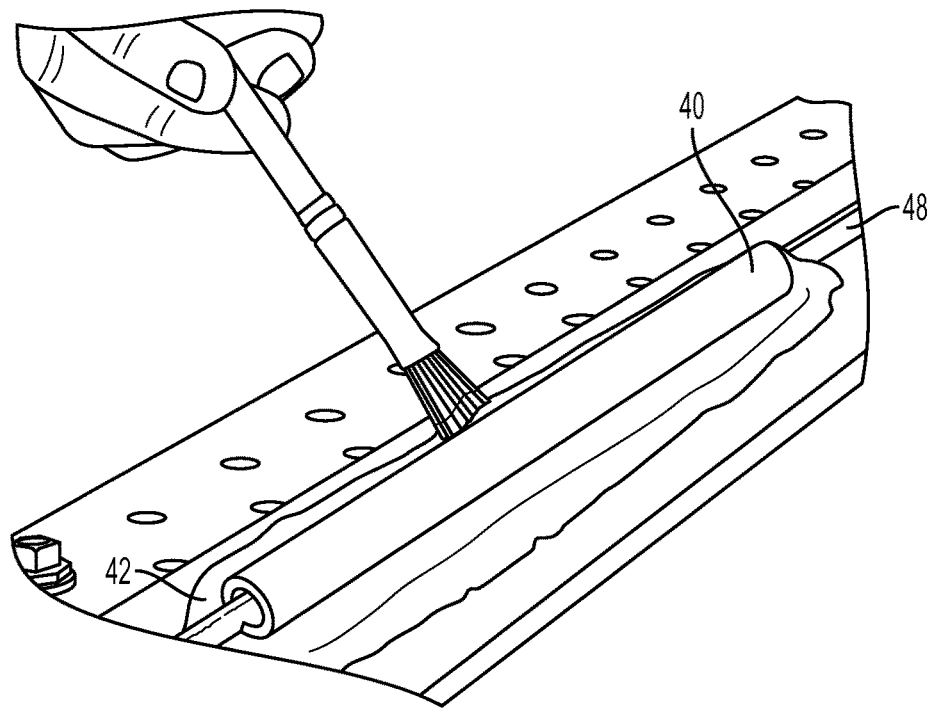
FIG. 10 shows a user smoothing excess wet sealant at a junction between the fuel cell seal and the fillet of FIG. 9.

FIG. 10 shows a user smoothing excess wet sealant 42 at the upper intersection region between fuel cell seal 40 and fillet 48 of FIG. 9. The excess wet sealant may be sealant that was originally applied to the seal and then displaced when the seal was placed onto the fillet, or it may have been applied at the upper intersection region after the seal was placed onto the fillet.

Figure 11:
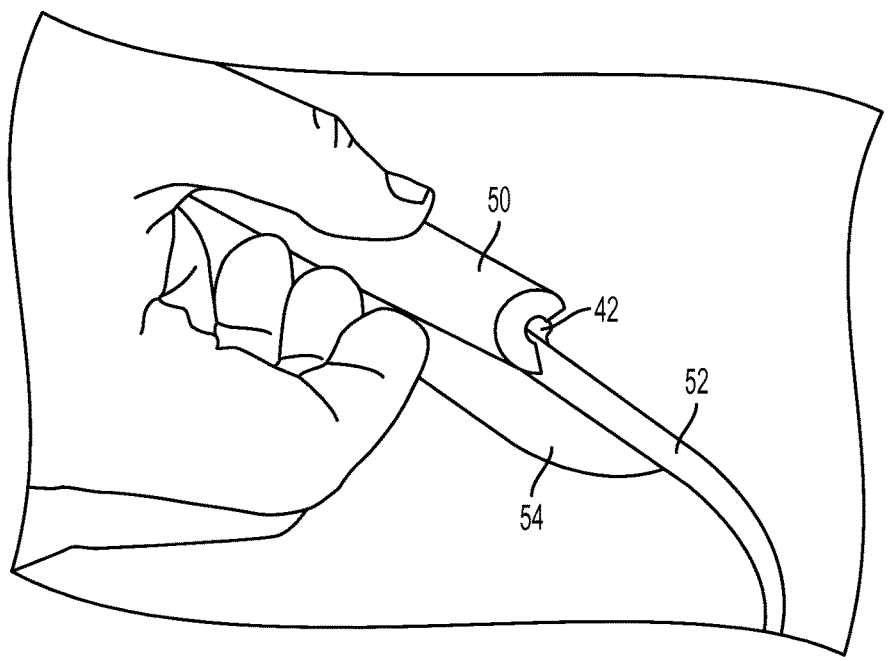
FIG. 11 shows a user placing an exemplary aircraft fuel cell seal onto an upper one of two adjacent fuel cell edges, according to aspects of the present disclosure.

FIG. 11 shows a user installing an exemplary aircraft fuel cell seal 50 onto an upper one 52 of two adjacent fuel cell edges 52, 54, according to aspects of the present disclosure. Adjacent fuel cell edges 52, 54 have substantially flush front surfaces in the manner depicted in region B of FIG. 6. Fuel cell seal 50 may be of the type described previously and depicted, for example, in FIGS. 1-4. Before installing seal 50 onto edge 52, the user typically would have filled the seal with wet sealant 42 as depicted in FIG. 7.

Figure 12:
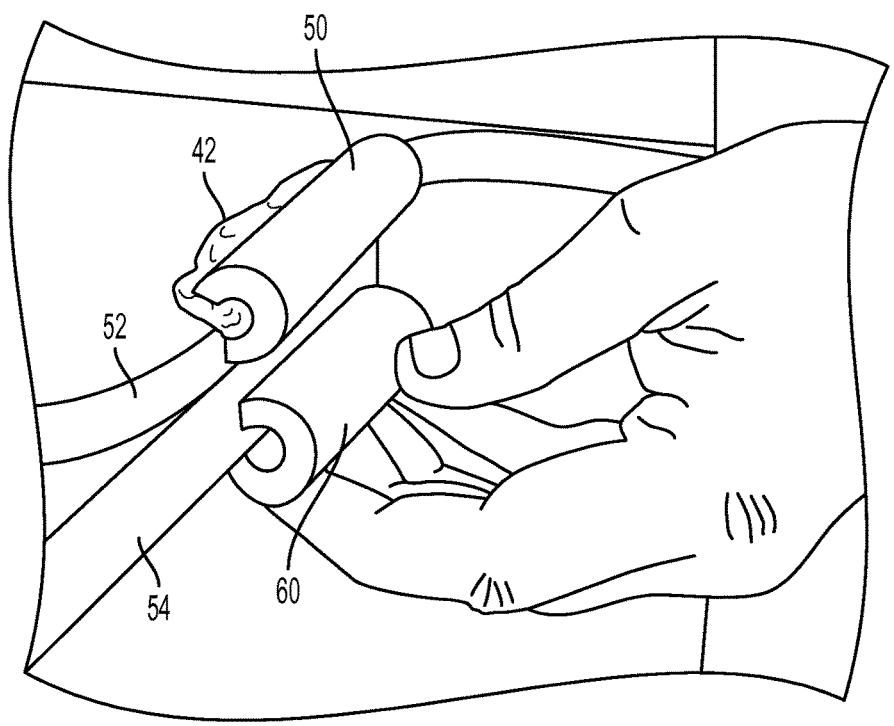
FIG. 12 shows a user placing an exemplary aircraft fuel cell seal onto the lower of the two adjacent fuel cell edges depicted in FIG. 11, according to aspects of the present disclosure.

FIG. 12 shows a user placing another exemplary aircraft fuel cell seal 60 onto lower fuel cell edge 54 depicted in FIG. 11, according to aspects of the present disclosure. Again, seal 60 typically would be a seal of a type described elsewhere in this disclosure, and typically would have been previously filled with wet sealant 42 as depicted in FIG. 7.

Figure 13:
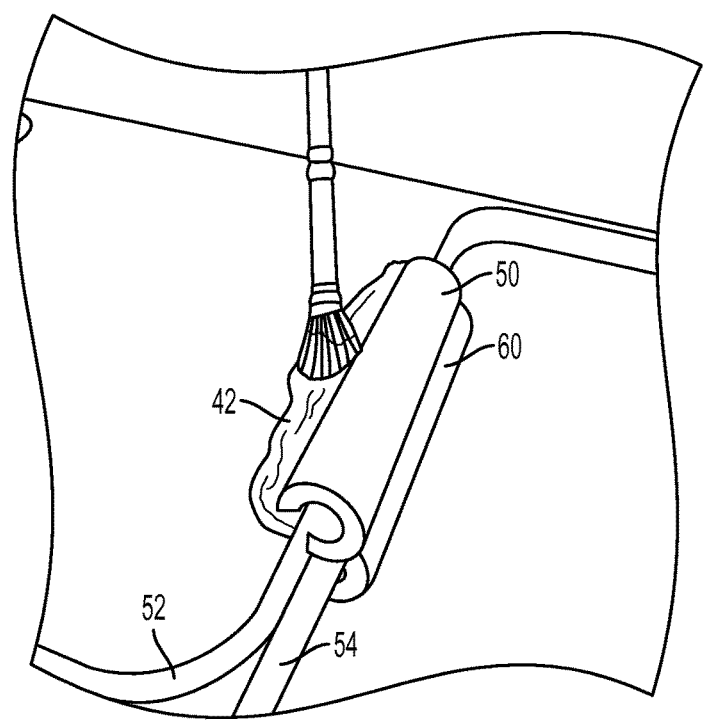
FIG. 13 shows a user smoothing excess wet sealant at a junction between the fuel cell seal and the upper fuel cell edge depicted in FIG. 11.

FIG. 13 shows a user smoothing excess wet sealant 42 at a junction between the fuel cell seal and the upper fuel cell edge depicted in FIG. 11. As in the case of the smoothing depicted in FIG. 10, excess sealant 42 may be sealant that was originally applied to the seal and then displaced when the seal was placed onto the fillet, or it may have been applied at the upper intersection region after the seal was placed onto the fillet.

Figure 14:
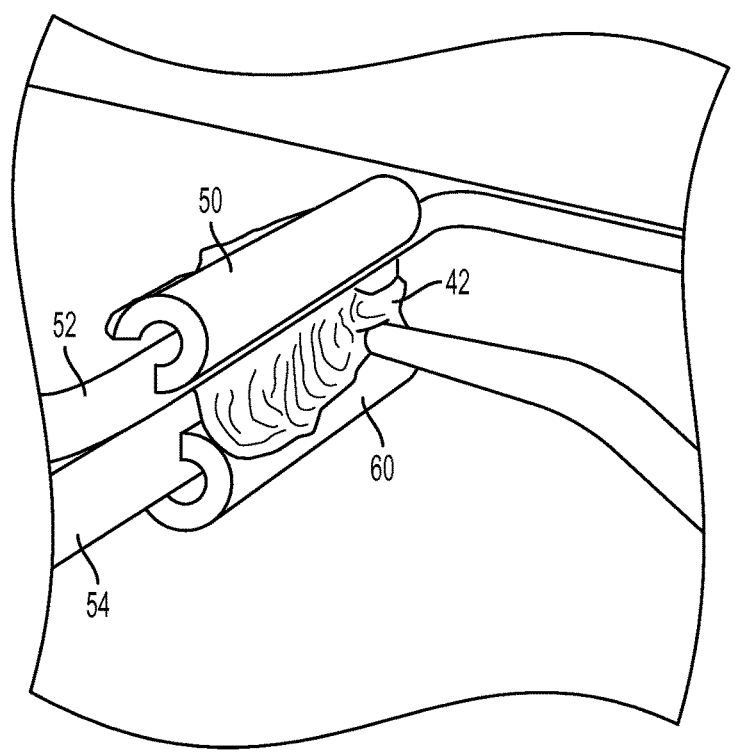
FIG. 14 shows a user applying additional wet sealant between the upper and lower fuel cell seals depicted in FIGS. 11-13.

FIG. 14 shows a user applying additional wet sealant 42 between the upper and lower fuel cell seals 50, 60 depicted in FIGS. 11-13. The additional sealant being applied in FIG. 14 may provide additional and/or redundant EME protection to fuel cell edges 52 and 54.

Figure 15:
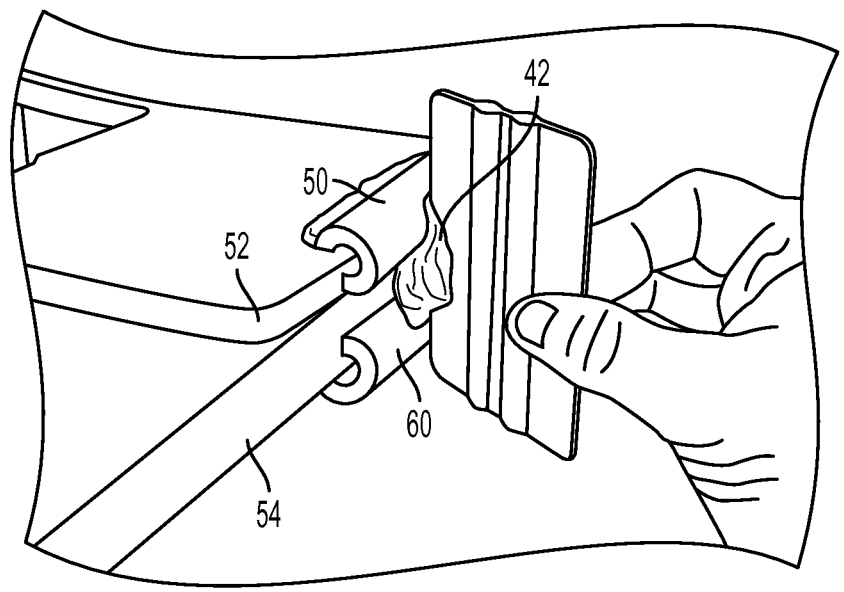
FIG. 15 shows a user fairing the sealant between the upper and lower fuel cell seals depicted in FIGS. 11-14.

FIG. 15 shows a user smoothing or fairing the sealant between the upper and lower fuel cell seals depicted in FIGS. 11-14. This results in a more uniformly thick layer of sealant between the upper and lower seals, and helps transport sealant to all desired locations between the seals.

Figure 16:
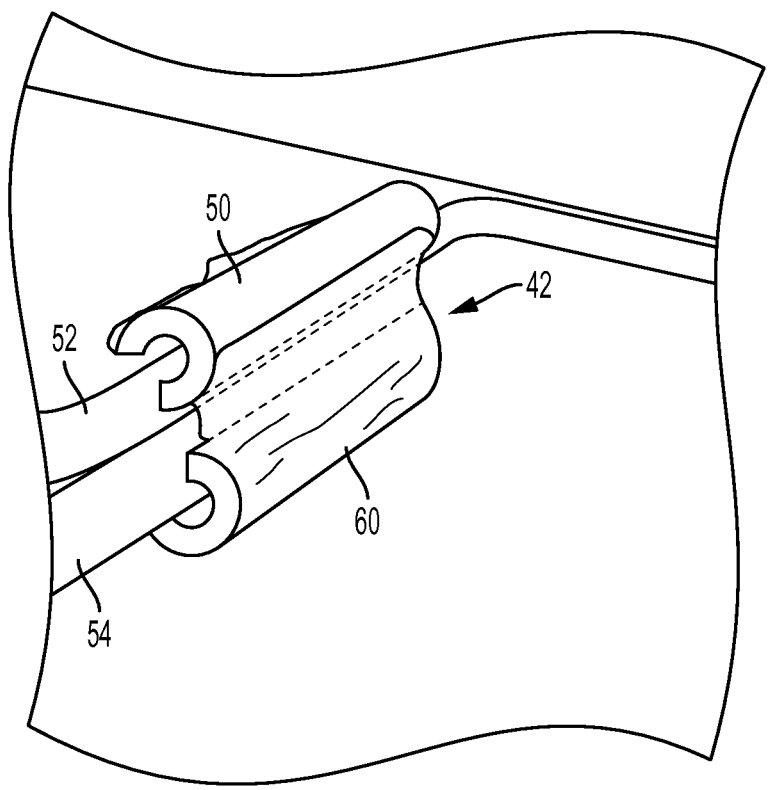
FIG. 16 shows the fuel cells seals of FIGS. 11-15 after the sealing process is complete.

FIG. 16 shows the upper and lower fuel cells seals of FIGS. 11-15 after the sealing process is complete. A relatively uniform layer of wet sealant 42 is now disposed in the region between the seals.

Example 3

Figure 17:
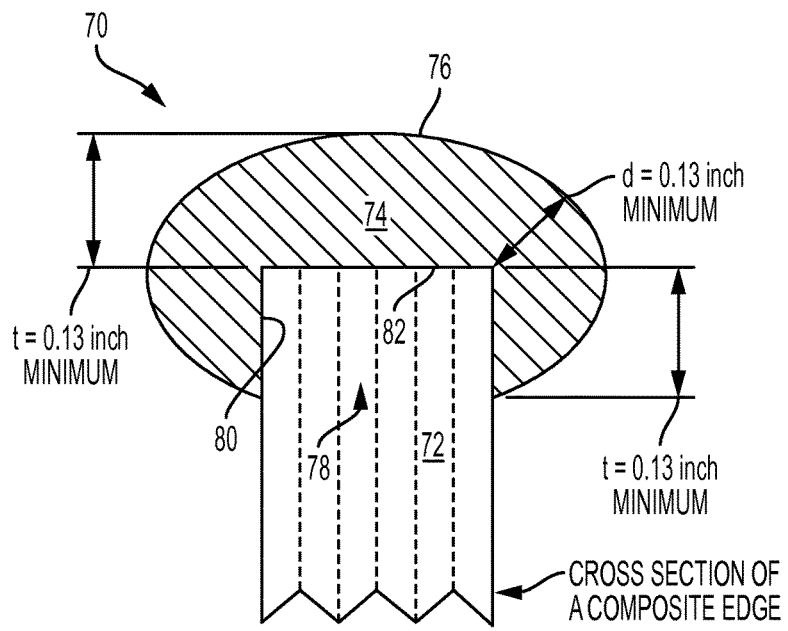
FIG. 17 is a sectional view of another aircraft fuel cell seal embodiment installed on an aircraft fuel cell edge, according to aspects of the present disclosure.

This example describes another embodiment of a pre-cured fuel cell seal having an elongate body with a partially oval or elliptic cross-sectional shape; see FIG. 17.

FIG. 17 is a schematic sectional view of another aircraft fuel cell seal embodiment, generally indicated at 70, positioned on an aircraft fuel cell edge according to aspects of the present disclosure. As FIG. 17 indicates, seal 70 may be particularly suitable for protecting a free edge such as free edge portion 38 disposed in region C of FIG. 6, in which it may be desirable for the seal to wrap entirely around the edge. Such a free edge portion is indicated at 72 in FIG. 17.

The steps for installing seal 70 on free edge 72 are generally similar to the steps for installing other pre-cured seals described above. More specifically, seal 70 may be filled with wet sealant, positioned as desired against a fuel cell edge, additional sealant may be applied, and/or excess sealant may be smoothed or faired.

Seal 70 generally includes many of the same features as seal 10 described above, such as a pre-cured elongate body member 74 with a curved outer surface 76, and at least one aperture, generally indicated at 78, which can be accessed through a gap 80 formed in the outer surface of the body member. Support members or ribs (not shown) also may be provided within aperture 78. These support members may be generally similar to the support members of seal 10.

Rather than forming a partial cylinder, curved outer surface 76 may be provided with a partially oval or elliptic shape, but again extending through a tangential angle between 180 degrees and 360 degrees to define complementary gap 80 in the outer shell. In this embodiment, gap 80 may be sized to accommodate the known thickness of the free edge to be protected, as FIG. 17 depicts. Accordingly, the angle subtended by the gap may depend on the thickness of the free edge to be protected. In any case, the shape of outer surface 76 may be chosen so that every portion of free edge 72 is covered by a predetermined minimum thickness of pre-cured material, such as 0.13 inches to meet current EME safety requirements.

In the embodiment of FIG. 17, free edge 72 abuts the inner surface 82 of body member 74, so there may not be open chambers or other internal space configured to receive wet sealant that can provide redundant EME protection. In other cases, by combining the features of the embodiment of FIGS. 1-5 with the embodiment of FIG. 17, a free edge seal can be constructed with a thick pre-cured outer shell having an oval or elliptic cross section, defining open chambers configured to receive a wet sealant. The internal chambers of such a seal could also be oval or elliptic in cross section, so that both the wet sealant and the pre-cured outer shell cover all parts of the free edge by at least a predetermined minimum amount, such as 0.13 inches. In other words, the present teachings contemplate a free edge seal that provides redundant EME protection in a manner similar to the redundant protection provided by seal 10.

Example 4

Figure 18:
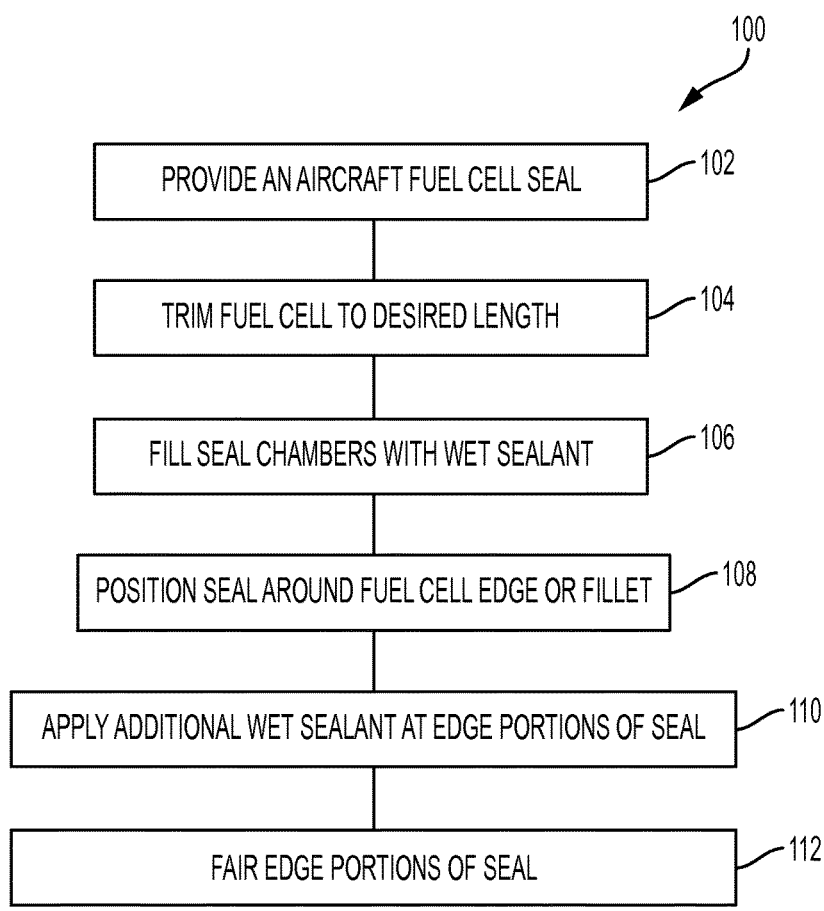
FIG. 18 is a flow chart depicting an exemplary method of sealing a fuel cell edge in an aircraft fuel cell, according to aspects of the present disclosure.

This example describes a method of sealing a fuel cell edge in an aircraft fuel cell; see FIG. 18. Aspects of fuel cell seals such as those shown in FIGS. 1-17 and described above may be utilized in the method steps described below. Where appropriate, reference may be made to these previously described components and systems that may be used in carrying out each step. These references are for illustration, and are not intended to limit the possible ways of carrying out any particular step of the method.

FIG. 18 is a flowchart illustrating steps performed in an illustrative method, and may not recite the complete process or all steps of the program. FIG. 18 depicts multiple steps of a method, generally indicated at 100, which may be performed in conjunction with fuel cell seals according to aspects of the present disclosure. Although various steps of method 100 are described below and depicted in FIG. 18, the steps need not necessarily all be performed, and in some cases may be performed in a different order than the order shown.

At step 102, an aircraft fuel cell seal is provided. The seal may have some or all of the characteristics described above with respect to FIGS. 1-17, such as a pre-cured elongate member with a curved outer shell having a thickness at least equal to a predefined minimum thickness and extending through a tangential angle between 180 degrees and 360 degrees to define a gap in the outer shell, a plurality of open chambers disposed within the outer shell, each defining a volume having a thickness at least equal to the predefined minimum thickness, and/or a plurality of support members disposed within the outer shell and separating the open chambers. The dimensions and materials of the various parts of the provided seal also may be as described previously.

At step 104, the fuel cell seal may be trimmed to a desired length, to accommodate a particular edge or fillet portion of an aircraft fuel cell.

At step 106, the open chambers of the fuel cell seal may be filled with a wet sealant, for example as depicted in FIG. 4 and described above.

At step 108, the fuel cell seal is positioned around a fuel cell edge or fillet, for example as depicted in FIG. 5 and described above.

At step 110, additional wet sealant is applied at edge portions of the fuel cell seal, after positioning the fuel cell seal around the fuel cell edge.

At step 112, the wet sealant is smoothed or faired at the edge portions of the fuel cell seal, after applying the additional wet sealant.

Example 5

This section describes additional aspects and features of fuel cell seals and methods of sealing fuel cell edges and fillets, presented without limitation as a series of paragraphs, some or all of which may be alphanumerically designated for clarity and efficiency. Each of these paragraphs can be combined with one or more other paragraphs, and/or with disclosure from elsewhere in this application, in any suitable manner. Some of the paragraphs below expressly refer to and further limit other paragraphs, providing without limitation examples of some of the suitable combinations.

A. An aircraft fuel cell seal, comprising:

a pre-cured elongate member with a curved outer shell having a radial thickness at least equal to a predefined minimum radial thickness and extending through a tangential angle between 180 degrees and 360 degrees to define a gap in the outer shell, a plurality of partially cylindrical open chambers disposed within the outer shell, each having a radius at least equal to a predefined minimum radius; and a plurality of support members disposed within the outer shell and separating the open chambers.

A1. The fuel cell seal of paragraph A, wherein the tangential angle is approximately 270 degrees.

A2. The fuel cell seal of paragraph A, wherein the predefined minimum radial thickness is 0.13 inches.

A3. The fuel cell seal of paragraph A2, wherein the predefined minimum radius is 0.13 inches.

A4. The fuel cell seal of paragraph A, wherein the ribs are spaced between 0.25-0.75 inches apart.

A5. The fuel cell seal of paragraph A4, wherein the ribs are spaced approximately 0.5 inches apart.

A6. The fuel cell seal of paragraph A, wherein the curved outer shell forms a partial cylinder.

A7. The fuel cell seal of paragraph A, wherein the predefined minimum radial thickness and the predefined minimum radius are each sufficient to meet aircraft electromagnetic environment safety requirements for a fuel cell seal.

A8. The fuel cell seal of paragraph A7, wherein the predefined minimum radial thickness and the predefined minimum radius are equal.

B. An aircraft fuel cell seal, comprising:

a pre-cured elongate sealing member with an outer shell having a thickness at least equal to a predefined minimum thickness and extending through a tangential angle between 180 degrees and 360 degrees to define a gap in the outer shell;

a plurality of support ribs disposed within the outer shell and oriented perpendicular to the shell; and a plurality of open chambers each bounded by the outer shell and two of the support ribs, and each having an open side defined by the gap in the outer shell.

B1. The fuel cell seal of paragraph B, wherein each open chamber defines a volume having a radial thickness at least equal to the predefined minimum thickness of the outer shell.

B2. The fuel cell seal of paragraph The fuel cell seal of paragraph B1, wherein the predefined minimum thickness is 0.13 inches.

B3. The fuel cell seal of paragraph B, wherein the tangential angle is at least 270 degrees.

B4. The fuel cell seal of paragraph B, wherein the outer shell and the open chambers are each cylindrical.

C. A method of sealing a fuel cell edge in an aircraft fuel cell, comprising:
providing an aircraft fuel cell seal, including:
a pre-cured elongate member with a curved outer shell having a thickness at least equal to a predefined minimum thickness and extending through a tangential angle between 180 degrees and 360 degrees to define a gap in the outer shell;
a plurality of open chambers disposed within the outer shell, each defining a volume having a thickness at least equal to the predefined minimum thickness; and
a plurality of support members disposed within the outer shell and separating the open chambers;
filling the open chambers with a wet sealant; and
positioning the fuel cell seal around a fuel cell edge.

C1. The method of paragraph C, further comprising applying additional wet sealant at edge portions of the fuel cell seal, after positioning the fuel cell seal around the fuel cell edge.

C2. The method of paragraph C1, further comprising fairing the wet sealant at the edge portions of the fuel cell seal, after applying additional wet sealant.

C3. The method of paragraph C, further comprising trimming the fuel cell seal to a desired length.

C4. The method of paragraph C, wherein the minimum thickness is 0.13 inches.

C5. The method of paragraph C, wherein the fuel cell edge is a free edge, and wherein after positioning the fuel cell seal around the edge, each portion of free edge is covered by at least 0.13 inches in thickness of the fuel cell seal.

ADVANTAGES, FEATURES, BENEFITS

The different embodiments of the fuel cell seals described herein provide several advantages over known solutions for sealing aircraft fuel cells. For example, the illustrative embodiments of fuel cell seals described herein allow for relatively faster installation, saving time and labor costs. Additionally, and among other benefits, illustrative embodiments of the fuel cell seals described herein provide redundant EME protection in case of partial seal failure or inadequacy of standard EME protection. Furthermore, the pre-cured portion of the fuel cell seals described herein provide standardized EME protection that is not reliant on the sufficient application of wet sealant by hand. No known system or device can provide these advantages. Thus, the illustrative embodiments described herein are particularly useful for decreasing labor costs and improving safety margins in fuel tank edge and fillet sealing. However, not all embodiments described herein provide the same advantages or the same degree of advantage.

CONCLUSION

The disclosure set forth above may encompass multiple distinct inventions with independent utility. Although each of these inventions has been disclosed in its preferred form(s), the specific embodiments thereof as disclosed and illustrated herein are not to be considered in a limiting sense, because numerous variations are possible. To the extent that section headings are used within this disclosure, such headings are for organizational purposes only, and do not constitute a characterization of any claimed invention. The subject matter of the invention(s) includes all novel and nonobvious combinations and subcombinations of the various elements, features, functions, and/or properties disclosed herein. The following claims particularly point out certain combinations and subcombinations regarded as novel and nonobvious. Inventions embodied in other combinations and subcombinations of features, functions, elements, and/or properties may be claimed in applications claiming priority from this or a related application. Such claims, whether directed to a different invention or to the same invention, and whether broader, narrower, equal, or different in scope to the original claims, also are regarded as included within the subject matter of the inventions of the present disclosure.

We claim:

1. An aircraft fuel cell seal, comprising:
a pre-cured elongate member with a curved outer shell having a radial thickness at least equal to a predefined minimum radial thickness, the curved outer shell extending circumferentially about a longitudinal axis of the elongate member in an angularly incomplete manner such that is subtends an angle of at least 180 degrees and less than 360 degrees to define an elongated gap in the outer shell, the gap for receiving an edge or a fillet of an aircraft fuel cell;
a plurality of partially cylindrical open chambers disposed within the outer shell, each having a radius at least equal to a predefined minimum radius; and
a plurality of support members disposed within the outer shell and separating the open chambers.

2. The fuel cell seal of claim 1, wherein the angle is approximately 270 degrees.

3. The fuel cell seal of claim 1, wherein the predefined minimum radial thickness is 0.13 inches.

4. The fuel cell seal of claim 3, wherein the predefined minimum radius is 0.13 inches.

5. The fuel cell seal of claim 1, wherein the ribs are spaced between 0.25-0.75 inches apart.

6. The fuel cell seal of claim 5, wherein the ribs are spaced approximately 0.5 inches apart.

7. The fuel cell seal of claim 1, wherein the curved outer shell forms a partial cylinder.

8. The fuel cell seal of claim 1, wherein the predefined minimum radial thickness and the predefined minimum radius are each sufficient to meet aircraft electromagnetic environment safety requirements for a fuel cell seal.

9. The fuel cell seal of claim 8, wherein the predefined minimum radial thickness and the predefined minimum radius are equal.

10. An aircraft fuel cell seal, comprising:
a pre-cured elongate sealing member with an outer shell having a thickness at least equal to a predefined minimum thickness, the curved outer shell extending circumferentially about a longitudinal axis of the elongate member in an angularly incomplete manner such that is subtends an angle of at least 180 degrees and less than 360 degrees to define an elongated gap in the outer shell, the gap for receiving an edge or a fillet of an aircraft fuel cell;

a plurality of support ribs disposed within the outer shell and oriented perpendicular to the shell; and a plurality of open chambers each bounded by the outer shell and two of the support ribs, and each having an open side defined by the gap in the outer shell.

11. The fuel cell seal of claim 10, wherein each open chamber defines a volume having a radial thickness at least equal to the predefined minimum thickness of the outer shell.

12. The fuel cell seal of claim 11, wherein the predefined minimum thickness is 0.13 inches.

13. The fuel cell seal of claim 10, wherein the angle is at least 270 degrees.

14. The fuel cell seal of claim 10, wherein the outer shell and the open chambers are each partially cylindrical.

15. A method of sealing a fuel cell edge in an aircraft fuel cell, comprising:

providing an aircraft fuel cell seal, including:

a pre-cured elongate member with a curved outer shell having a thickness at least equal to a predefined minimum thickness, the curved outer shell extending circumferentially about a longitudinal axis of the elongate member in an angularly incomplete manner such that is subtends an angle of at least 180 degrees and less than 360 degrees to define an elongated gap in the outer shell, the gap for receiving an edge or a fillet of an aircraft fuel cell;

a plurality of open chambers disposed within the outer shell, each defining a volume having a thickness at least equal to the predefined minimum thickness; and a plurality of support members disposed within the outer shell and separating the open chambers;

filling the open chambers with a wet sealant; and positioning the fuel cell seal around a fuel cell edge.

16. The method of claim 15, further comprising applying additional wet sealant at edge portions of the fuel cell seal, after positioning the fuel cell seal around the fuel cell edge.

17. The method of claim 16, further comprising fairing the wet sealant at the edge portions of the fuel cell seal, after applying additional wet sealant.

18. The method of claim 15, further comprising trimming the fuel cell seal to a desired length.

19. The method of claim 15, wherein the minimum thickness is 0.13 inches.

20. The method of claim 15, wherein the fuel cell edge is a free edge, and wherein after positioning the fuel cell seal around the edge, each portion of free edge is covered by at least 0.13 inches in thickness of the fuel cell seal.

* * * * *